United States Patent
Muehlmann (10) Patent No.: US 9,013,277 B2
(45) Date of Patent: Apr. 21, 2015

(54) METHOD OF ALLOCATING DIGITAL DATA COMING FROM TRANSPONDERS AND A READER THERETO

(75) Inventor: Ulrich Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 920 days.

(21) Appl. No.: 12/747,080

(22) PCT Filed: Dec. 1, 2008

(86) PCT No.: PCT/IB2008/055028
§ 371 (c)(1),
(2), (4) Date: Jun. 9, 2010

(87) PCT Pub. No.: WO2009/074911
PCT Pub. Date: Jun. 18, 2009

(65) Prior Publication Data
US 2010/0265044 A1    Oct. 21, 2010

(30) Foreign Application Priority Data

Dec. 11, 2007  (EP) .................................... 07122861
Dec. 1, 2008   (WO) .................. PCT/IB2008/055028

(51) Int. Cl.
*G06K 7/00*     (2006.01)
*G06K 7/10*     (2006.01)

(52) U.S. Cl.
CPC .......... *G06K 7/0008* (2013.01); *G06K 7/10019* (2013.01)

(58) Field of Classification Search
None
See application file for complete search history.

(56) References Cited

U.S. PATENT DOCUMENTS

| 5,995,019 | A  | * | 11/1999 | Chieu et al. ................. 340/10.32 |
| 6,353,406 | B1 |   | 3/2002  | Lanzl et al. |
| 6,686,830 | B1 |   | 2/2004  | Schirtzer |
| 7,369,036 | B1 | * | 5/2008  | Vacherand et al. .......... 340/10.1 |
| 2001/0042235 | A1 | * | 11/2001 | Djokovic et al. ............. 714/792 |
| 2002/0036569 | A1 | * | 3/2002  | Martin ....................... 340/573.1 |
| 2003/0026283 | A1 | * | 2/2003  | Currivan et al. ............. 370/441 |
| 2005/0201492 | A1 | * | 9/2005  | Wu et al. ...................... 375/329 |

(Continued)

FOREIGN PATENT DOCUMENTS

CN    1913415 A    2/2007
EP    1 596 521 A2  11/2005

(Continued)

*Primary Examiner* — Brian Zimmerman
*Assistant Examiner* — Kevin Lau (57) ABSTRACT

In a method of allocating digital data (55a, 55b) coming from transponders, a reader (1) receives a first signal (13) that comprises a first signal component (7) coming from a first transponder (2) and a second signal component (8) coming from a second transponder (3). The digital data (55a) coming from the first transponder (2) are encoded in the first signal component (7) and digital data (55b) coming from the second transponder (3) are encoded in the second signal component (8). Second and third signals (10, 11) are generated by subjecting the first signal (13) to an in-phase and to an in-quadrature demodulation. The digital data (55a, 55b) of the first and second transponders (2, 3) are encoded in the second and third signals (10, 11). Clusters (51-54) of the digital data (55 a, 55b) associated with a constellation diagram, which is related to the second and third signals (10, 11), are allocated to the first and second transponder (2, 3).

12 Claims, 6 Drawing Sheets

(56) References Cited

U.S. PATENT DOCUMENTS

| | | |
|---|---|---|
| 2006/0220794 A1 | 10/2006 | Zhu |
| 2007/0025475 A1 | 2/2007 | Okunev |
| 2007/0085689 A1* | 4/2007 | Brommer et al. .......... 340/572.8 |
| 2007/0200712 A1* | 8/2007 | Arneson et al. ............ 340/572.8 |
| 2007/0297534 A1* | 12/2007 | Okunev ........................ 375/316 |
| 2008/0231424 A1* | 9/2008 | Arnitz .......................... 340/10.1 |
| 2009/0103646 A1* | 4/2009 | Dowling et al. ............. 375/265 |

FOREIGN PATENT DOCUMENTS

| | | |
|---|---|---|
| EP | 1 744 267 A2 | 1/2007 |
| EP | 1 848 141 A2 | 10/2007 |
| WO | 99/60510 A1 | 11/1999 |
| WO | 03049275 A1 | 6/2003 |
| WO | WO 2007023472 A2 * | 3/2007 |

* cited by examiner

METHOD OF ALLOCATING DIGITAL DATA COMING FROM TRANSPONDERS AND A READER THERETO

FIELD OF THE INVENTION

The invention relates to a method of allocating digital data coming from transponders and a reader thereto.

BACKGROUND OF THE INVENTION

Transponders, which are also referred to as tags or labels, are well known in the art and are designed to communicate with a reader, which is also known as a base station. Usually, the reader sends a signal to the transponder. If the transponder is close enough to the reader, then the transponder receives this signal and sends a response signal to the reader.

International application for patent No. 99/60510 discloses a system for contactless identification of a plurality of transponders located in a communication volume defined by an electromagnetic field coming from a reader. When the reader wants to investigate if and which transponders are in its range, the reader sends a query signal, usually known as an inventory command. The inventory command comprises information about a plurality of reply windows (time slots), in which the transponders are supposed to reply to the inventory command. In response to the inventory command, each of the transponders selects a reply window (time slot) during which it transmits its reply signal. The transponders randomly choose one of the time slots for transmitting their reply signals. Thus, collisions may occur if at least two transponders reply during the same time slot. Then, a conventional reader discards the reply signals and sends a new inventory command until it receives unambiguous reply signals from the transponders. This procedure, however, is relatively time consuming.

OBJECT AND SUMMARY OF THE INVENTION

It is an object of the present invention to provide a method of allocating digital data coming from transponders at the same time.

Another object of the present invention is to provide a reader, which is capable of allocating digital data coming from more than one transponder at the same time.

The object is achieved in accordance with the invention by means of a method of allocating digital data coming from transponders, comprising the steps of:

receiving at a reader a first signal that comprises a first signal component coming from a first transponder and a second signal component coming from a second transponder, wherein digital data coming from the first transponder are encoded in the first signal component and digital data coming from the second transponder are encoded in the second signal component;

generating second and third signals by subjecting the first signal to an in-phase and to an in-quadrature demodulation, the digital data of the first and second transponders being encoded in the second and third signals; and allocating clusters of the digital data associated with a constellation diagram, which is related to the second and third signals, to the first and second transponder.

The object is also achieved in accordance with the invention by means of a reader configured to communicate with a plurality of transponders, comprising:

a receiver configured to receive a first signal that comprises a first signal component coming from a first transponder and a second signal component coming from a second transponder, wherein digital data coming from the first transponder are encoded in the first signal component and digital data coming from the second transponder are encoded in the second signal component; and an IQ-demodulator configured to generate second and third signals by subjecting the first signal to an in-phase and to an in-quadrature demodulation, the digital data of the first and second transponders being encoded in the second and third signals;

wherein the reader is configured to allocate clusters of the digital data associated with a constellation diagram, which is related to the second and third signals, to the first and second transponder.

Thus, the reader is configured to carry out the inventive method.

Usually, when a reader initiates a communication with transponders, it sends a query command, also known as an inventory command. Upon receiving this command, transponders being within the radio range of the reader respond to the query by generating and sending reply signals, which include encoded digital data. For a reliable communication, the transponders respond during different time slots. If, however, two transponders respond during the same time slot, then the reader receives a single signal, i.e. the first signal, which includes information about the reply signals of both transponders. Then, the first signal comprises the first and second signal components, i.e. a colliding signal comprising digital data coming from both transponders.

In order to allocate the received digital data to the relevant transponder, the first signal (the signal the reader receives) is subjected to the IQ-de-modulation (in-phase and in quadrature demodulation). IQ demodulation per se is well known in the art. Due to the IQ demodulation, the second and third signals are generated from the first signal. Thus, the digital data of both transponders are encoded in the second and third signals.

Due to the IQ demodulation, the second and third signals are orthogonal to each other. The IQ-demodulation may be realized by correlating the first signal with sine and cosine signals. For instance, correlating the first signal with a cosine signal may generate the second signal and correlating the first signal with a sine signal may generate the third signal. The signal that is generated by correlating the first signal with the cosine signal is also referred to be in-phase and the signal that is generated by correlating the first signal with the sine signal is also referred to be in-quadrature.

The data encoded in the second and third signals can be visualized by a constellation diagram. Constellation diagrams per se are also well known in the art. Generally, a constellation diagram is a representation of a signal modulated by a digital modulation scheme. It displays the signal as a two-dimensional scatter diagram in the complex plane at symbol (data) sampling instants. It thus represents the possible symbols (data) that may be selected by a given modulation scheme as points (constellation points) in the complex plane.

As the symbols (data) are represented as complex numbers, they can be visualized as the constellation points on the complex plane. The real and imaginary axes are also known as the in phase, or I-axis and the quadrature, or Q-axis. Plotting several symbols in a scatter diagram produces the constellation diagram.

Due to noise and possible distortion, the digital data are not exactly mapped to the ideal constellation points in a real system, but rather are clustered around them. As a result, digital data belonging to a cluster in the constellation diagram are related to one of the transponders. If, however, the amplitudes and/or particularly the phases of the first and second signal components at the reader differ (which is very likely), then the clusters of digital data related to the first transponder and the clusters related to the second transponder do not overlap. Hence, associating the clusters, and thus their data, to the relevant transponder is enabled.

The digital data are encoded in the first and second signal components by means of digital modulation schemes. In one embodiment, this digital modulation scheme is Amplitude Shift Keying (ASK) modulation. Other possible modulation schemes may include PSK (Phase Shift Keying), BPSK (Binary Phase Shift Keying), or QAM (Quadrature Amplitude Modulation). If utilizing QAM modulation, then the first and second signal components have each two components being orthogonal to each other, wherein each component is modulated utilizing an ASK modulation scheme. Miller sub-carrier coding is also applicable.

If, for instance, Amplitude Shift Keying is used for encoding the digital data in the first and second signal components, then the digital data of the relevant transponder is either logical "0" or logical "1". Then, each transponder is related to a pair of clusters, wherein one of the clusters is related to digital data with logical "0" and the other cluster is related to logical "1". Furthermore, due to the IQ-demodulation, the clusters of a pair of clusters or their centers of gravity are located symmetrical to the origin of the constellation diagram, easing the allocation of the relevant clusters to the relevant transponder.

If, for instance, the phases of the first and second signal components at the reader differ, then a first line connects the centers of gravity of the clusters related to the first transponder and a second line connects the centers of gravity of the clusters related to the second transponder. The two lines run through the origin of the constellation plane and intersect each other at an angle corresponding to the phase shift of the first and second signal component phases. Accordingly, the different clusters do not overlap.

If the amplitudes of the first and second signal components differ significantly, then the clusters related to one of the transponders are further away from the constellation diagram origin then the cluster related to the other transponder. Accordingly, the different clusters do not overlap as well.

In one embodiment of the inventive method or the inventive reader, the digital data of the first pair of clusters are mapped to a first pair of constellation points within the constellation diagram, and the digital data of the second pair of clusters are mapped to a second pair of constellation points, wherein the constellation points of the first pair of constellation points are symmetric to the origin of the constellation diagram and the constellation points of the second pair of constellation points are symmetric to the origin of the constellation diagram. This mapping may particularly be performed such that the coordinates of the constellation points of the first pair of constellation points are (1; j) and (−1, −j) and the coordinates of the constellation points of the second pair of constellation points are (−1; j) and (1, −j). Such a rearrangement (mapping) performs separation and equalization as well.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
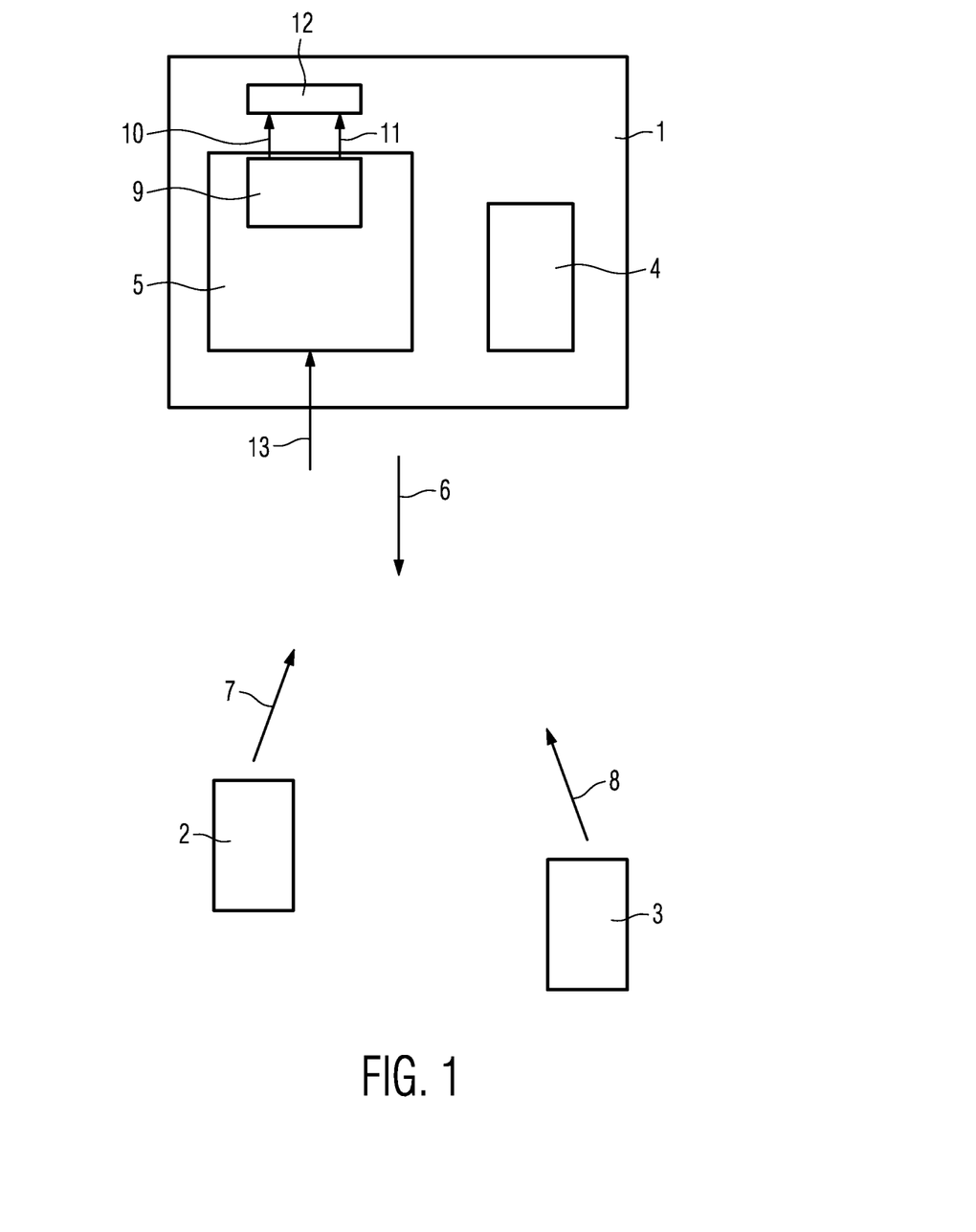
FIG. 1 is an RFID reader and two transponders.

FIG. 1 shows an RFID reader 1, a first transponder 2, and a second transponder 3. The reader 1 comprises a sender 4 and a receiver 5. When initiating a communication with the transponders 2 and 3, the reader 1 transmits an inventory command 6 by means of its sender 4. According to the exemplary embodiment, the inventory command 6 of the reader 1 is transmitted utilizing an UHF electro-magnetic field, as it is known per se in the art. The inventory command 6 may also comprise information about time slots the transponders 2 and 3 can choose when responding.

Figure 2A:
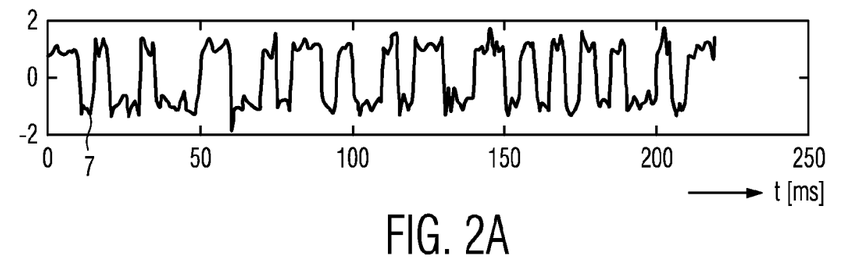
FIGS. 2A, 2D are signals transmitted by the transponders.
Figure 2B:
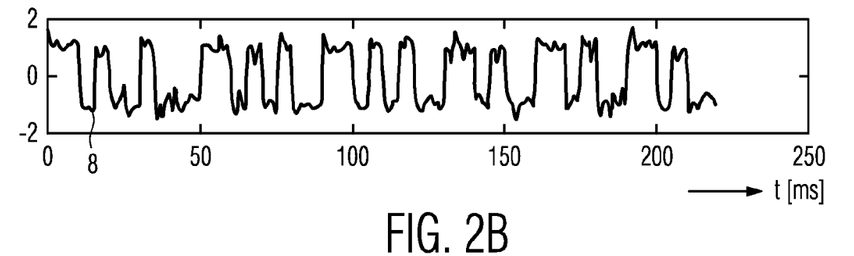

If the transponders 2 and 3 are within the radio range of the reader 1, they receive the inventory command 6. In response to the received inventory command 6, the first transponder 2 generates and sends a first reply signal 7, and the second transponder 3 generates and sends a second reply signal 8. According to the exemplary embodiment, digital data 55 transmitted from the transponders 2 and 3 utilizing the reply signals 7 and 8 are encoded utilizing an ASK (Amplitude Shift Keying) modulation scheme. FIG. 2A shows an example of the first reply signal 7 and FIG. 2B shows an example of the second reply signal 8 arriving at the reader 1. The reply signals 7 and 8 of FIGS. 2A and 2B include a preamble, a 16-bit random number and random noise. The generation of the reply signals 7 and 8 is known per se in the art and is based, for instance, on backscattering. Thus, said generation is not explained in detail.

If the transponders 2 and 3 send their reply signals 7 and 8 during the same time slot, then the reply signals 7 and 8 collide, and the reader 1 receives a signal 13 being comprised of the two reply signals 7 and 8.

Figure 3A:
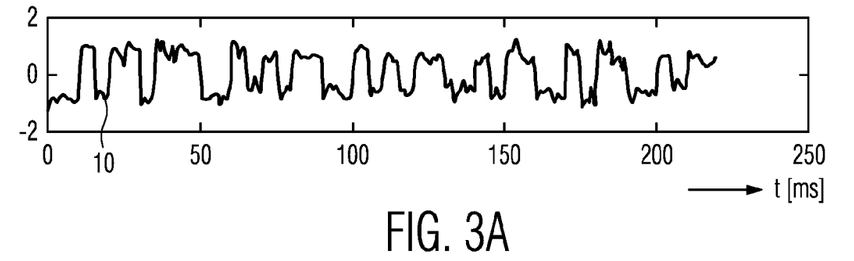
FIGS. 3A, 3B are signals generated from a signal received by the reader.
Figure 3B:
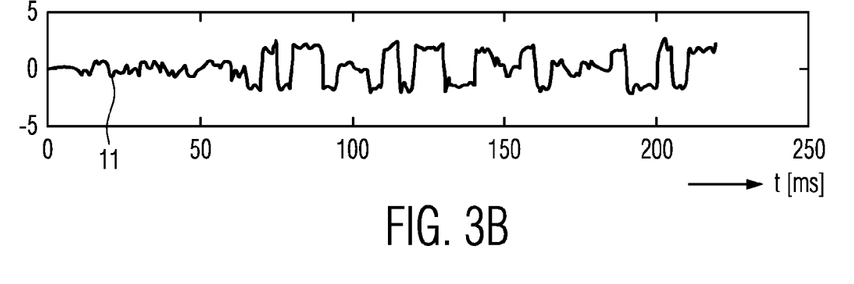

According to the exemplary embodiment, the receiver 5 of the reader 1 comprises an IQ-demodulator 9. The demodulator 9 is configured to generate first and second signals 10 and 11 from the received signal 13 that are orthogonal to each other. One of the two signals, for instance, the first signal 10 is usually referred to as in phase and the other signal (second signal 11) is usually referred to as in quadrature. FIG. 3A shows the first signal 10 and FIG. 3B shows the second signal 11 generated from the colliding reply signals 7 and 8 received by the reader 1.

Figure 4:
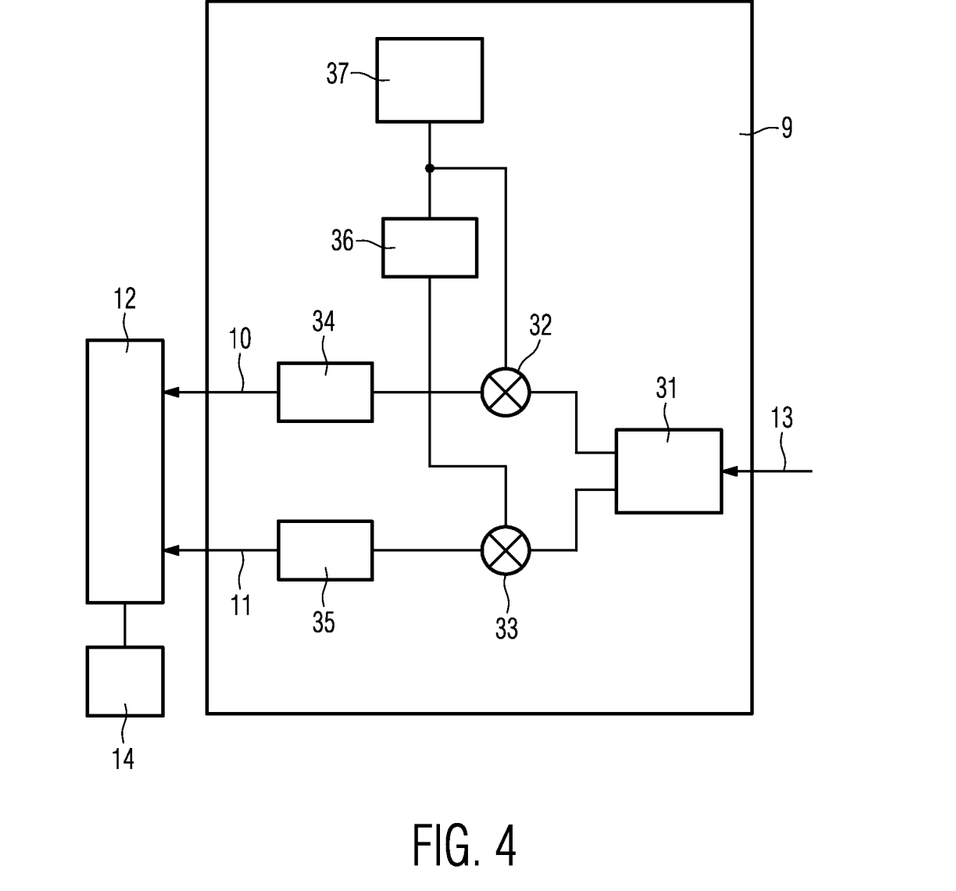
FIG. 4 is an IQ-demodulator of the reader.

FIG. 4 shows an example how the demodulator 9 can be implemented. The demodulator 9 comprises a splitter 31, first and second mixers 32, 33, first and second image rejection filters 34, 35, a phase-shifter 36 (here a 90° shifter), and a cosine wave signal generator 37, which generates a signal having a frequency f, of, for instance, 915 MHz. The frequency f, corresponds to the carrier frequency of the first and second reply signals 7 and 8.

The splitter 31 basically splits the received signal 13 that is composed of the colliding received signals 7 and 8 into two identical received signals. One of the split signals is fed to the first mixer 32 and the other split signal is fed to the second mixer 33. The first mixer 32 is connected to the signal generator 37. The second mixer 33 is connected to the phase-shifter 36, which is connected to the signal generator 37. Therefore, the input signals of the first mixer 32 are signals received by the reader 1 and a cosine signal having the frequency f, and the input signals of the second mixer 33 are signals received by the reader 1 and a sine signal having the frequency f. The output signals of the mixers 32, 33 are thus orthogonal to each other and are passed through the image rejection filters 34, 35. The output signal of the first image rejection filter 34 is the first signal 10 and the output signal of the second image rejection filter 35 is the second signal 11. The first and second signals 10 and 11 are fed to a microprocessor 12 and are stored in a memory 14 of the reader 1. Since according to the exemplary embodiment the transponders 2 and 3 reply during the same time slot, i.e. at the same time to the inventory command 6, the first and second signals 10 and 11 have each a component related to the first reply signal 7 of the first transmitter 2 and a component related to the second reply signal 8 of the second transponder 3.

Figure 5:
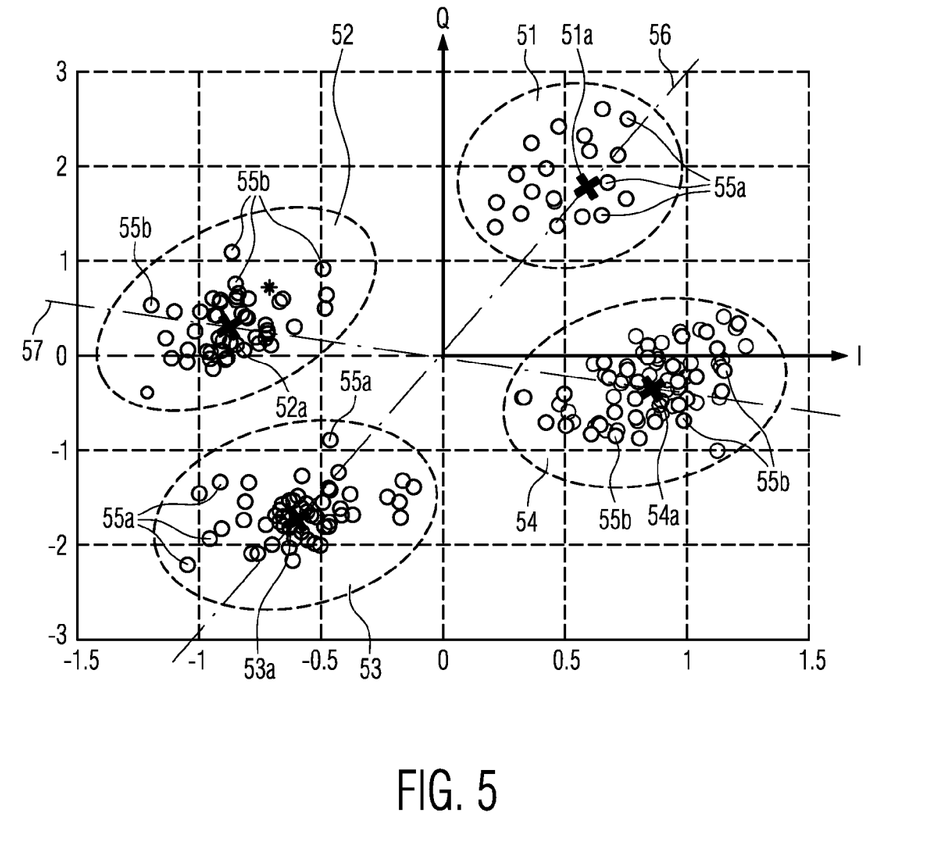
FIGS. 5 and 6 are constellation diagrams.

The signals 10, 11 can be visualized utilizing a constellation diagram depicted in FIG. 5. Constellation diagrams per se are known in the art. Generally, a constellation diagram is a representation of a signal modulated by a digital modulation scheme such as, for instance, quadrature amplitude modulation or phase-shift keying. It shows the signal as a two-dimensional scatter diagram in the complex plane at symbol sampling instants. Thus, it represents the possible symbols (data) that may be selected by a given modulation scheme as points in the complex plane.

As the symbols (data) are represented as complex numbers, they can be visualized as points on the complex plane. The real and imaginary axes are also known as the in phase, or I-axis and the quadrature, or Q-axis. Plotting several symbols in a scatter diagram produces the constellation diagram. The points on a constellation diagram are normally called "constellation points".

As mentioned hereinbefore, the transponders 2 and 3 modulate their digital data 55 on carrier signals in order to generate the signals 7 and 8. As a result, the digital data 55 coming from the first transponder 2 are clustered at two clusters, whose centers of gravity are symmetric to the origin of the constellation diagram, and the digital data 55 coming from the second transponder 3 are clustered at two clusters, whose centers of gravity are symmetric to the origin of constellation diagram as well. According to the exemplary embodiment, the digital data 55 coming from the first transponder 2 are clustered within a pair of clusters 51, 53, whose centers of gravity are denoted by the reference sings 51a and 53a. The centers of gravity 51a, 53a are symmetric to the origin of the constellation diagram and thus lie on a line 56 intersecting the origin of the constellation diagram. The data 55a of one of the clusters of the pair of clusters 51, 53 are related to logical "1" and the data 55a of the other cluster of this pair of clusters 51, 53 are related to logical "0". The digital data 55b coming from the second transponder 3 are clustered within a pair of clusters 52, 54, whose centers of gravity are denoted by the reference sings 52a and 54a according to the exemplary embodiment. The centers of gravity 52a, 54a are symmetric to the origin of the constellation diagram and thus lie on a line 57 intersecting the origin of the constellation diagram. The data 55b of one of the clusters of the pair of clusters 52, 54 are related to logical "1" and the data 55b of the other cluster of this pair of clusters 52, 54 are related to logical "0".

Even though the transponders 2 and 3 respond during the same time slot according to the exemplary embodiment, it is unlikely that they start transmitting their reply signals 7 and 8 "exactly" at the same time and/or that they are spaced apart from the reader at the same distance. Therefore, the amplitudes and/or particularly the phases of the carrier signals and thus the amplitudes and/or particularly the phases of the signals 7, 8 arriving at the reader probably differ. As a result, the pair of clusters 51, 53 associated with the first transponder 2 and the pair of clusters 52, 54 associated with the second transponder 3 are likely to be located at different locations within the constellation diagram allowing to decode the digital data 55a, 55b and to allocate the digital data 55a, 55b to the respective transponder 2, 3. This allocation is particularly performed based on the Euclidian distance between the centers of gravity 51a-54a of each cluster 51-54.

Figure 6:
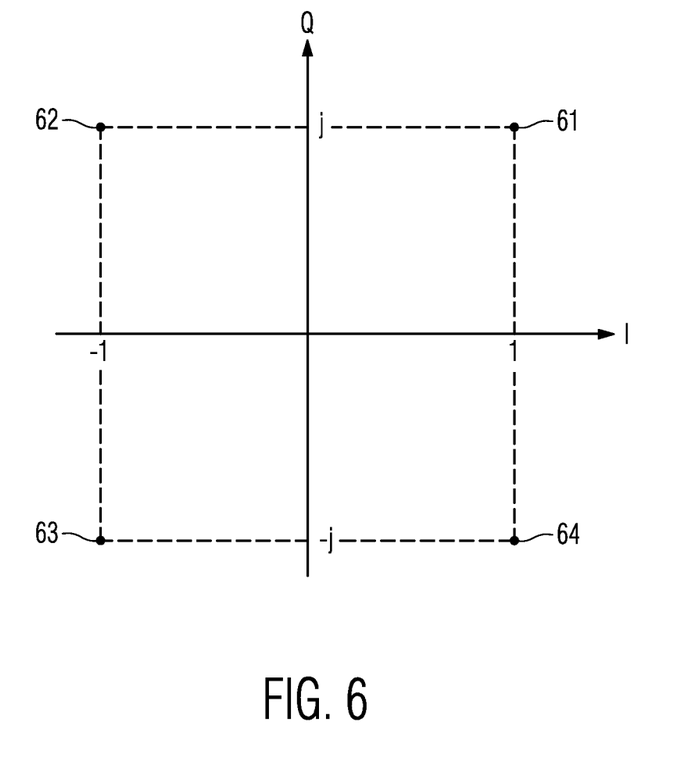

For an improved further processing, the following mapping of the clusters 51-54 is performed by the microprocessor 12 according to the exemplary embodiment:

The individual digital data 55a, 55b of the clusters 51-54 are mapped within the constellation diagram to constellation points 61 having the coordinate (1; j), 62 having the coordinate (−1; j), 63 having the coordinate (−1, −j), and 64 having the coordinate (1, −j) as shown in FIG. 6. In particular, the digital data 55a of the pair of clusters 51, 53 associated with the first transponder 2 are mapped to the constellation points 61, 63, and the digital data 55b of the pair of clusters 52, 54 associated with the second transponder 3 are mapped to the constellation points 62, 64. More specifically, the digital data 55a of the cluster 51 are mapped to the constellation point 61 having the coordinate (1; j), the digital data 55a of the cluster 53 are mapped to the constellation point 63 having the coordinate (−1; −j), the digital data 55b of the cluster 52 are mapped to the constellation point 62 having the coordinate (−1; j), and the digital data 55b of the cluster 54 are mapped to the constellation point 64 having the coordinate (1; −j). This arrangement performs separation and equalization of received digital data 55a, 55b.

Figure 7A:
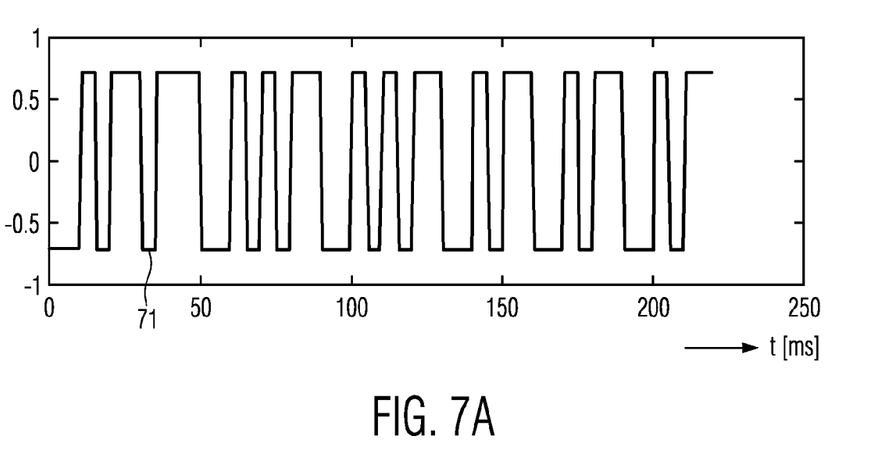
FIGS. 7A and 7B are equalized signals at the reader.
Figure 7B:
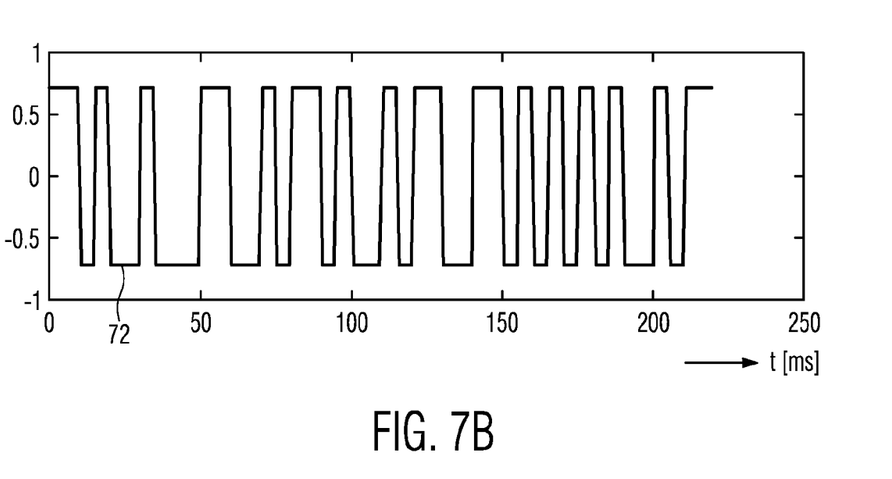

As a result, the signal received by the reader 1 and associated with the first transponder 2 is shifted to the I-channel associated with the constellation diagram, and the signal received by the reader 1 and associated with the second transponder 3 is shifted to the Q-channel associated with the constellation diagram. The separated and equalized signals at the reader 1 are denoted by the reference signs 71, 72 and are shown in FIGS. 7A and 7B, wherein FIG. 7A shows the equalized signal 71, which includes the encoded information coming from the first transponder 2, and FIG. 7B shows the equalized signal 72, which includes the encoded information coming from the second transponder 3.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of allocating digital data coming from transponders, comprising the steps of:

receiving at a reader a first signal that comprises a first signal component coming from a first transponder and a second signal component coming from a second transponder during a same time slot in which the first and second transponders respond to an inventory command from the reader at different time points, wherein digital data coming from the first transponder are encoded in the first signal component and digital data coming from the second transponder are encoded in the second signal component;

generating second and third signals by subjecting the first signal to an in-phase and to an in-quadrature demodulation; and allocating clusters of the digital data associated with a constellation diagram, which is related to the second and third signals, to the first and second transponders, wherein a first pair of the clusters is only related to the first transponder, a second pair of the clusters is only related to the second transponder, the centers of gravity of the first pair of the clusters are symmetric to the origin of the constellation diagram, and the centers of gravity of the second pair of the clusters are symmetric to the origin of the constellation diagram.

2. The method of claim 1, wherein the digital data are encoded in the first and second signal components by means of an Amplitude Shift Keying modulation scheme.

3. The method of claim 1, further comprising
mapping the digital data of the first pair of clusters to a first pair of constellation points within the constellation diagram, and mapping the digital data of the second pair of clusters to a second pair of constellation points; the constellation points of the first pair of constellation points being symmetric to the origin of the constellation diagram and the constellation points of the second pair of constellation points being symmetric to the origin of the constellation diagram.

4. The method of claim 3, wherein the coordinates of the constellation points of the first pair of constellation points are (1; j) and (−1, −j) and the coordinates of the constellation points of the second pair of constellation points are (−1; j) and (1, −j).

5. A reader configured to communicate with a plurality of transponders, comprising:

a receiver configured to receive a first signal that comprises a first signal component coming from a first transponder and a second signal component coming from a second transponder during a same time slot in which the first and second transponders respond to an inventory command from the reader at different time points, wherein digital data coming from the first transponder are encoded in the first signal component and digital data coming from the second transponder are encoded in the second signal component; and an IQ-demodulator configured to generate second and third signals by subjecting the first signal to an in-phase and to an in-quadrature demodulation;

wherein the reader is configured to allocate clusters of the digital data associated with a constellation diagram, which is related to the second and third signals, to the first and second transponders, wherein a first pair of the clusters is only related to the first transponder, a second pair of the clusters is only related to the second transponder, the centers of gravity of the first pair of the clusters are symmetric to the origin of the constellation diagram, and the centers of gravity of the second pair of the clusters are symmetric to the origin of the constellation diagram.

6. The reader of claim 5, wherein the digital data are encoded in the first and second signal components by means of an Amplitude Shift Keying modulation scheme.

7. The reader of claim 5, further being configured to map the digital data of the first pair of clusters to a first pair of constellation points within the constellation diagram, and to map the digital data of the second pair of clusters to a second pair of constellation points; the constellation points of the first pair of constellation points being symmetric to the origin of the constellation diagram; and the constellation points of the second pair of constellation points being symmetric to the origin of the constellation diagram.

8. The reader of claim 7, wherein the coordinates of the constellation points of the first pair of constellation points are (1; j) and (−1, −j) and the coordinates of the constellation points of the second pair of constellation points are (−1; j) and (1, −j).

9. The method of claim 1, wherein the first pair of the clusters comprises a first cluster that only corresponds to logical 1 of the first signal component coming from the first transponder and a second cluster that only corresponds to logical 0 of the first signal component coming from the first transponder.

10. The method of claim 9, wherein the second pair of the clusters comprises a third cluster that only corresponds to logical 1 of the second signal component coming from the second transponder and a fourth cluster that only corresponds to logical 0 of the second signal component coming from the second transponder.

11. The reader of claim 5, wherein the first pair of the clusters comprises a first cluster that only corresponds to logical 1 of the first signal component coming from the first transponder and a second cluster that only corresponds to logical 0 of the first signal component coming from the first transponder.

12. The reader of claim 11, wherein the second pair of the clusters comprises a third cluster that only corresponds to logical 1 of the second signal component coming from the second transponder and a fourth cluster that only corresponds to logical 0 of the second signal component coming from the second transponder.

* * * * *